US012785735B2

(12) United States Patent
Petkov et al.

(10) Patent No.: US 12,785,735 B2
(45) Date of Patent: Nov. 3, 2026

(54) METHOD FOR IMPROVING ANTENNA MATCHING AND NODE

(71) Applicant: Diehl Metering Systems GmbH, Nuremberg (DE)

(72) Inventors: Hristo Petkov, Nuremberg (DE); Christoph Schmidt, Nuremberg (DE); Thomas Kauppert, Nuremberg (DE); Klaus Gottschalk, Winkelhaid (DE); Simon Schroeter, Erlangen (DE); Benjamin Meyer, Nuremberg (DE)

(73) Assignee: Diehl Metering Systems GmbH, Nuremberg (DE)

( * ) Notice: Subject to any disclaimer, the term of this patent is extended or adjusted under 35 U.S.C. 154(b) by 196 days.

(21) Appl. No.: 18/903,460

(22) Filed: Oct. 1, 2024

(65) Prior Publication Data

US 2025/0023591 A1 Jan. 16, 2025

Related U.S. Application Data

(62) Division of application No. 17/580,060, filed on Jan. 20, 2022, now Pat. No. 12,166,514.

(30) Foreign Application Priority Data

Feb. 1, 2021 (DE) .................... 10 2021 102 208.8

(51) Int. Cl.
*H04B 1/04* (2006.01)
*H01Q 5/335* (2015.01)
(Continued)

(52) U.S. Cl.
CPC .......... *H04B 1/0458* (2013.01); *H01Q 5/335* (2015.01); *H04B 17/13* (2015.01); *H04B 17/336* (2015.01)

(58) Field of Classification Search
None
See application file for complete search history.

(56) References Cited

U.S. PATENT DOCUMENTS

| | | | |
|---|---|---|---|
| 9,673,850 | B2 | 6/2017 | Nisar et al. |
| 2008/0129610 | A1 | 6/2008 | Tsfati et al. |

(Continued)

FOREIGN PATENT DOCUMENTS

| | | | |
|---|---|---|---|
| CN | 105706360 | A | 6/2016 |
| DE | 102014111735 | A1 | 2/2016 |

(Continued)

*Primary Examiner* — Parul H Gupta
(74) *Attorney, Agent, or Firm* — Laurence A. Greenberg; Werner H. Stemer; Ralph E. Locher

(57) ABSTRACT

A method improves antenna matching for a node, in particular a sensor apparatus and/or actuator apparatus, of a communications network. The node is capable of radio communication and has a radio module equipped with an antenna and a transmit path and/or receive path for radio signals to be emitted and/or received. The node has a power supply apparatus, which is preferably energy self-sufficient, in particular a battery. The antenna has an impedance and in the receive situation and/or in the transmit situation in the case of adjustable matchings, preferably by use of adjustable matching networks, the signal to noise ratio associated with each matching is estimated, and a matching is selected from the different matchings for the receive mode and/or the transmit mode.

6 Claims, 9 Drawing Sheets

(51) Int. Cl.
*H04B 17/13* (2015.01)
*H04B 17/336* (2015.01)

(56) References Cited

U.S. PATENT DOCUMENTS

| | | | | |
|---|---|---|---|---|
| 2010/0087195 | A1 | 4/2010 | Lu et al. | |
| 2010/0177749 | A1* | 7/2010 | Essinger | G06F 1/1626<br>370/338 |
| 2010/0177750 | A1* | 7/2010 | Essinger | H04L 67/12<br>345/522 |
| 2011/0064066 | A1 | 3/2011 | Lamba et al. | |
| 2012/0163434 | A1 | 6/2012 | Kim et al. | |
| 2015/0126136 | A1 | 5/2015 | Robinett et al. | |
| 2018/0167112 | A1 | 6/2018 | Lee et al. | |
| 2022/0247440 | A1* | 8/2022 | Petkov | H04B 1/123 |
| 2023/0163745 | A1* | 5/2023 | Guo | H04B 1/0057<br>370/277 |
| 2024/0243477 | A1* | 7/2024 | Alpman | H01Q 9/0414 |

FOREIGN PATENT DOCUMENTS

| | | | |
|---|---|---|---|
| DE | 102016010045 | A1 | 2/2018 |
| EP | 3285403 | A1 | 2/2018 |
| GB | 2529887 | A | 3/2016 |

* cited by examiner

METHOD FOR IMPROVING ANTENNA MATCHING AND NODE

CROSS-REFERENCE TO RELATED APPLICATION

This application is a divisional of U.S. patent application Ser. No. 17/580,060, filed Jan. 20, 2022; this application also claims the priority, under 35 U.S.C. § 119, of German patent application DE 10 2021 102 208.8, filed Feb. 1, 2021; the prior applications are herewith incorporated by reference in their entirety.

FIELD AND BACKGROUND OF THE INVENTION

The invention relates to a method according to the preamble of the main method claim for improving the antenna matching of a node in a communication network, in particular of a sensor apparatus and/or actuator apparatus, which node is capable of unidirectional or bidirectional radio communication. The present invention also relates to a node capable of radio communication and operated according to the present method.

The current trend in communications technology is to integrate more and more processors, communication modules and other electronic components into everyday objects. Even simple electrical devices for everyday use are meant to be equipped with a communications capability in the foreseeable future. It is hoped that this trend will create great opportunities for the economy and also for home life. Smart, or intelligent, objects are increasingly being equipped with information and communications technology and connected to cyberspace with its extensive services. This will give everyday objects a new amenity. Objects can use sensors to detect their surroundings, connect to each other, access Internet services, or even interact with people. Such sensors are intended to be used as "nodes" in what is called the IoT ("Internet of Things"). However, "nodes" can also be actuators that act mechanically or electromagnetically on objects or apply (electrical, preferably digital) control signals to these objects.

Such sensors or actuators are meant to be as compact as possible. Since a mains connection is often not available, they usually have to be operated in a self-sufficient manner by batteries. For this reason, it must be possible to run radio communication reliably with as little expenditure of energy as possible. In the radio module of a node, this requires a high total sensitivity resulting from good resonant matching of the circuit to the antenna is assumed. The small space available for installing such communication modules constrains the antenna to be narrowband.

At the same time, the demand for ever greater capacity for generating and sending data will result in greater energy consumption by the nodes. Technology in the field of electrical energy storage is not keeping pace, however. Therefore, any expansion in functionality of the nodes as a result of the "IoT" will cause problems in terms of the energy consumption this requires.

In the case of sensors, there is also an interest in investigating the situational or object surroundings of the sensors when analyzing the radio-transmitted measured variables specifically retrieved by the sensors. For example, it is possible that sensor apparatuses are not installed in the locations or housings that were originally planned. In addition, in the case of sensors, it is desirable to find out about certain situations, for instance tampering with permanently installed sensors (e.g., consumption meters) or shielding of sensors. For example, metal parts or dielectric materials, such as plastics parts, for instance, in the vicinity of an antenna of the sensor or actuator can influence the antenna impedance, making flexible impedance matching desirable. Furthermore, temporary perturbation sources can mean that packets can still be received but deliver a reduced receive power. In this context, it is desirable to employ additional sensor technology at the sensors or actuators concerned. However, this in turn requires additional sensors and/or processors, which increase the energy consumption further.

Published, non-prosecuted German patent application DE 10 2016 010 045 A1 discloses a method according to the preamble of the independent method claim This document relates to a method for improving antenna matching in a smart meter in transmit mode. The antenna matching can be achieved by switching between matching networks, which comprise inductances and/or capacitances, having different design values. Each smart meter in a network transmits a plurality of test packets to a data collector using a correspondingly different matching network. The data collector assesses the test packets from all the smart meters in terms of their received field strength, selects the test packet that has the highest receive field strength, and feeds the selection back to the relevant smart meter. From then on, this transmits using the corresponding antenna matching. The disadvantage with this method is that, especially when signal powers are weak, for instance in a node located at the boundary of a radio cell, any distinction between, and thus any selection of, a specific antenna matching is no longer possible. In addition, the increased transmission of test packets places a load on the battery.

SUMMARY OF THE INVENTION

The object of the present invention is to improve further the method of the type in question in terms of its antenna matching.

This object is achieved by a method having the features of the independent method claim. The further claims contain expedient embodiments of the method according to the invention.

According to the invention, in the receive situation in the case of variable antenna matching by different matchings, which allow different transformation paths, preferably by means of adjustable matching networks, the SNR ratio associated with each impedance matching is estimated, for instance in the node, and from the different matchings a matching is selected, for instance by the node, for the receive and/or the transmit mode of the node.

Unlike the method in published, non-prosecuted German patent application DE 10 2016 010 045 A1, there is no need for any prior transmission because, according to the invention, antenna matching can take place in the receive situation for the node. Alternatively, transmission, as in DE 10 2016 010 045 A, is also possible in the method according to the invention. In this case, however, it is sufficient to transmit only one message or a few messages in the uplink. The receiver in the base station then estimates the SNR ratio instead of the signal power, as in DE 10 2016 010 045 A. The invention makes it possible to support also systems that have small or even negative SNRs. This is not possible in DE 10 2016 010 045 A. A node located at the radio-cell boundary is received only with a very low signal power. If, for example, the system supports a negative SNR of −8 dB, for instance, the recipient, for instance a base station, cannot distinguish a signal power that allows the SNR to rise from −8 dB to −4 dB.

The SNR can preferably be estimated repeatedly over a plurality of packets within a message, thereby saving energy in the radio channel. The SNR also allows the detection of perturbation sources in order to detect and screen out erroneous measurements. Far less energy is consumed by the method according to the invention. As a consequence, it is possible to extend greatly the operating life for a node that runs self-sufficiently, for instance using a battery, preferably a long-life battery. In addition, the receive mode for antenna matching that is possible according to the invention achieves a large reduction in the load on the radio channel, because sensor apparatuses or actuator apparatuses in a data network no longer need to transfer the different antenna matchings successively in advance in transmit mode for checking by a receiving node or base station. Furthermore, reflection losses can be reduced or prevented by virtue of matching the impedance. The reachability of the node in the downlink is improved. The appropriately matched impedance can also be used for the transmit mode, thereby improving the quality of the data transfer from the node concerned to the recipient of the transmission.

A plurality of different impedances of the antenna can expediently be set by means of matching networks, wherein the impedance is matched on the basis of a comparison of the different SNR ratios of the receive path of the radio module in the receive situation, which are caused, for instance, by different matching networks or by the matching network. The different matching networks can be used to change the total sensitivity of the receive path, taking into account the impedance of the antenna. In order to find out which matching is the best, the respective SNR ratios are determined and compared directly with each other, or values derived therefrom are compared with each other. Thus, an associated SNR ratio can be determined for each impedance matching, i.e., for each transformation path or matching.

It can hence be provided that a plurality of successive different matchings are set by means of the matching networks, for each of which the associated SNR ratio is determined, and a matching thereof is selected from the number of matchings on the basis of a criterion for the transmit and/or receive mode, which criterion depends on the determined SNR ratio.

Preferably, that matching is selected for which the estimated SNR ratio and/or the value derived therefrom is most favorable or most suitable for a receive mode and/or a transmit mode of the node. For instance, this is preferably the matching that has the largest estimated SNR ratio.

The SNR ratio refers to the ratio of signal power to noise power. The SNR ratio can be ascertained from an analog signal or alternatively from a digital signal. The noise figure can be determined from the SNR ratio.

In the case of a digital signal, the SNR ratio is a carrier-to-noise ratio (CNR or C/N). The carrier-to-noise ratio refers to the ratio of the power of the modulated carrier signal to the noise power after filtering.

The method according to the invention can advantageously also be used when there is a negative SNR ratio.

In ascertaining the SNR ratio, the bandwidth of the transmission can be included as an additional parameter. In particular, the SNR ratio is taken into account only for a specified bandwidth. This allows the SNR ratio to be ascertained even more accurately.

As part of the method according to the invention, in the case of ascertaining the SNR ratio for at least one bit, the power per bit with respect to the noise power can be ascertained, or alternatively, in the case of ascertaining the SNR ratio for at least one symbol, the power per symbol with respect to the noise power can be ascertained and compared according to the selectable matching circuits.

The SNR ratio is preferably determined with respect to the receive bandwidth of a frequency band representing a symbol. In this case, the symbol power of a plurality of preferably identical symbols can preferably be used to determine the SNR ratio.

The symbols are preferably symbols based on frequency modulation and/or amplitude modulation, for instance MSK, FSK, QPSK modulation.

In the case of an MSK symbol, for example, the noise power can preferably be ascertained from the orthogonal after detection of the phase rotation of the MSK symbol.

In the case of FSK modulation, one filter for each symbol or bit can be set, and the noise power can be separated from the signal power for the purpose of estimating the SNR.

Filters (preferably analog and/or digital) can be concatenated in order to take account of the bandwidth. Analog signals can preferably be represented digitally in this case. The noise power can thereby be separated from the signal power for the purpose of estimating the SNR.

Preferably, the node or its radio module is normally in a sleep mode, and only opens at specific instants in time a receive window, during which a search for analyzable receive signals takes place. This can keep the energy consumption low.

Provided a search for a receive signal was negative within a receive window, the receive window is closed again, and a new receive window in which a new search is performed can be opened according to a specified mode. This procedure can be repeated until finally a receive signal is found. This also conserves the self-sufficient power source.

For the purpose of searching for the receive signal and determining or estimating the SNR ratio, the receive bandwidth can be partitioned into individual frequency channels, and a power measurement made in each frequency channel. The powers measured in the frequency channels can then be compared, and the presence of a receive signal, or the receive signal power, can be determined or estimated therefrom.

The power is detected preferably only for one selected frequency band of the receive bandwidth. For instance, in the case of FSK modulation, it is possible to exploit the property that only one symbol or bit is allowed to be transmitted at a particular instant in time. If two filters having the symbol bandwidth are used, for instance, then signal power and noise power can be separated easily. This can additionally reduce the microprocessor power required and consequently the energy consumption.

For the purpose of searching for the receive signal and estimating the SNR ratio, it is also possible to relate a measured power to the symbol duration or a multiple thereof, and/or to analyze the input signal over the time length or the symbol duration.

For the purpose of searching for the receive signal and/or determining or estimating the SNR ratio, the power can be detected over a sequence of a plurality of identical bits or symbols. This further increases the accuracy with which the SNR ratio is determined or estimated.

According to an expedient embodiment, identical symbols are detected in the input signal, the detected symbols are encoded, and are used to determine or estimate the SNR ratio for the individual symbols. In MSK modulation, estimating the SNR can be implemented, for instance, such that the signal power and noise power have a phase difference of 90°. This can help in separating the signal power from the noise power. The different S-components and N-components can be combined in order to obtain an SNR or else used separately for determining the impedance.

Alternatively, it can be established on the basis of a correlation with a pre-known bit sequence in the input signal whether or not an input signal is present. The SNR estimates can be performed on the basis of a pre-known sequence, in particular a pilot sequence, training sequence or synchronization sequence. The synchronization sequence can be implemented as a preamble, midamble or postamble.

In this case, given a plurality of symbols, averaging of the power components can be performed in the real part, whereby the averaging removes the noise component.

When determining the SNR ratio for digital signals, the input signal can be converted immediately via a suitable interface into digital data or I/Q data, and the associated SNR ratio can be determined digitally from the digital data or I/Q data. For example for this purpose, data can be diverted out of the digital data stream after the receiver, for instance by means of a switch, and used specifically for ascertaining the SNR.

It is also possible to ascertain the power by analog means, however. In this case, the respective values of the SNR are estimated and immediately saved in the receive chip. This measure is faster, because it is only necessary to wait for a few bits or symbols rather than the entire packet. Setting the impedance or selecting the impedance matching can already have been performed by means of this procedure.

It can be provided in particular that the different impedance matchings are cycled through within a data packet, preferably within a synchronization sequence thereof, wherein the respective SNR ratios are detected, the SNR ratios for the different impedances are compared, and an impedance setting is selected therefrom for which the determined SNR ratio is high, preferably the highest.

The receive signal for ascertaining the SNR ratio may be different in nature or origin. For example, it may be a downlink signal from another node, e.g. a data collector or a base station in the radio network, which signal in particular has a standardized power and/or transmit time, or may be an uplink signal from at least one other node in the radio network, which uplink signal preferably has a pre-known waveform. In the latter case, the probability of encountering a packet is particularly high because of the full channel utilization. It is also possible, however, to use an external wanted signal that has a waveform used by the node.

A further expedient embodiment of the method according to the invention consists in empirically determining, and storing in the node, a dependency of the gain on the different matching-dependent transformation paths. In addition, a dependency of the noise power on the different matching-dependent transformation paths in the receive path can be established empirically, and likewise stored in the node, wherein the impedance of the antenna is determined or estimated from the change in the gain and noise power caused by the different impedance settings. This can be performed preferably on the basis of considering an approximation or best fit.

This can be done advantageously by empirically determining, and storing in the node for later retrieval, the noise figure and/or the change in noise figure and/or the gain factor and/or a change in the gain factor and/or empirically estimated power components S and noise components N for a plurality of impedances of the receive path, wherein:

a) a plurality of the predefined selectable transformation paths are cycled through, for each of which the impedance of the receive path is changed, b) an associated model noise-figure and/or an associated model gain-factor is determined in each case from the above data, and a model base-noise is calculated therefrom, c) the base noise is measured for the transformation paths while the node is operating, and d) the gain is measured for the transformation paths while the node is operating.

It can be provided advantageously that the node sends for different impedances a plurality of packets or segments of packets, a receiver in a base station estimates the SNR on the basis of the packets or the segments of packets, and notifies the node of an SNR from the estimated SNRs, preferably the highest SNR or the best match or corresponding information based thereon.

It can also be provided that the node sends a packet or a segment of a packet for the different matchings or transformation paths, and in a receiving, additional node, for instance a base station, the different matchings or transformation paths are known, the SNRs for the different matchings or transformation paths are calculated in the base station, and the base station notifies the node of an SNR from the calculated SNRs, preferably the highest SNR or the best match or corresponding information based thereon.

A change in the SNR ratio without a change in the matching circuit is preferably detected and/or analyzed.

According to an embodiment of the present method, the SNR ratios for a transmit situation for the node, and for a receive situation in the base station, can be taken into account and/or analyzed in combination with each other. The noise matching for receiving and the noise matching for transmitting can thereby be optimized simultaneously.

The present invention also relates to a node capable of unidirectional or bidirectional radio communication, in particular to a sensor apparatus and/or actuator apparatus in a communications network operated using a method according to the independent method claims.

The power supply apparatus, which is self-sufficient over a long period, in particular a long-life battery, of the node in particular has a capacity of less than 10 Ah. For this reason, the energy-saving effect of the method according to the invention is particularly significant compared with the known method for improving the antenna matching.

The method according to the invention is preferably suitable for narrowband systems, i.e., in particular for band systems at a frequency of less than 100 kHz, preferably less than 80 kHz, more preferably less than 50 kHz. In particular, the antenna has a 3-dB bandwidth of less than 1 MHz.

Other features which are considered as characteristic for the invention are set forth in the appended claims.

Although the invention is illustrated and described herein as embodied in a method for improving antenna matching, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
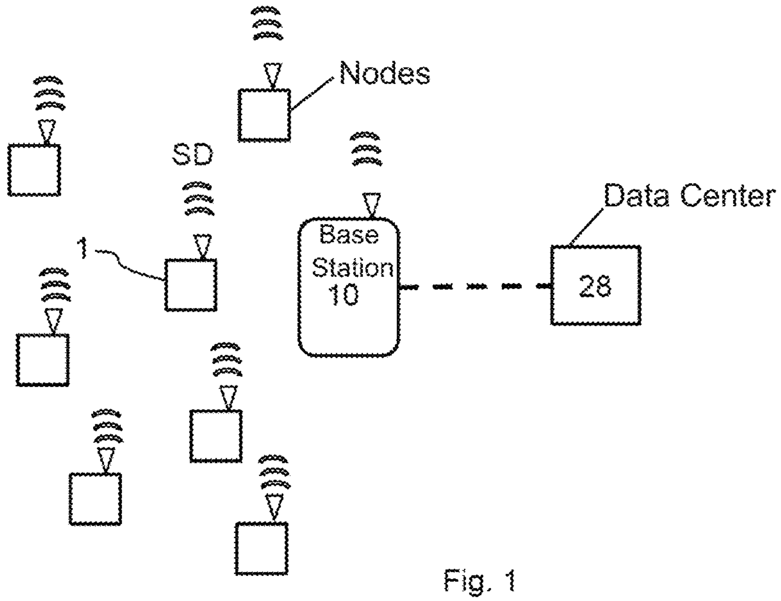
FIG. 1 is a highly simplified schematic diagram of an arrangement of a plurality of nodes capable of bidirectional radio communication, and of a base station and a data center or Cloud in a communications network.

Referring now to the figures of the drawings in detail and first, particularly to FIG. 1 thereof, there is shown an arrangement of a plurality of nodes 1, for instance in the form of sensor apparatuses, capable of unidirectional or bidirectional radio communication. These transmit, in the uplink, data SD, for instance consumption data and/or other operating data, by radio to a base station 10. This may be a data collector, for example. In the base station 10, data is conditioned and forwarded, for instance via the Internet, to a data center 28 or Cloud for further use. In the case of a node 1 capable of bidirectional radio communication, this node can receive data in the downlink from the base station 10. In addition, according to an embodiment variant, a design in which nodes 1 can also communicate with one another is also possible if required.

A node in the form of a sensor apparatus can measure, for instance, a physical or chemical property E, for example the temperature of an object, the flow rate of a fluid as part of a flow meter, or the electrical conductivity (for instance to measure a salt content). Alternatively, for instance, a sensor apparatus can determine by means of the reaction with reagents, the constituent materials B or, for example, a water quality. A color change indicates whether the water quality is good enough. Finally, a sensor apparatus may also produce measured variables relating to situational information I. Such sensor apparatuses can generally be used in implementing the “Internet of Things” (IoT).

The node 1 could also be an actuator apparatus. An actuator receives electrical signals and acts on an external object. Apart from the classical case of a mechanical effect (for instance by means of a rod operated by the actuator), there is also the option of an electromagnetic effect (when the actuator produces an electric or magnetic field that holds a ferromagnetic object in a certain position). Finally, the actuator may also cause a secondary reaction in the object by means of control signals, and act in a certain sense as a translator of signals, which it receives itself via radio, into electrical signals, which it forwards over a line.

Finally, a node 1 could combine properties both of a sensor apparatus of the type described above and also of an actuator apparatus of the type described above.

Figure 2:
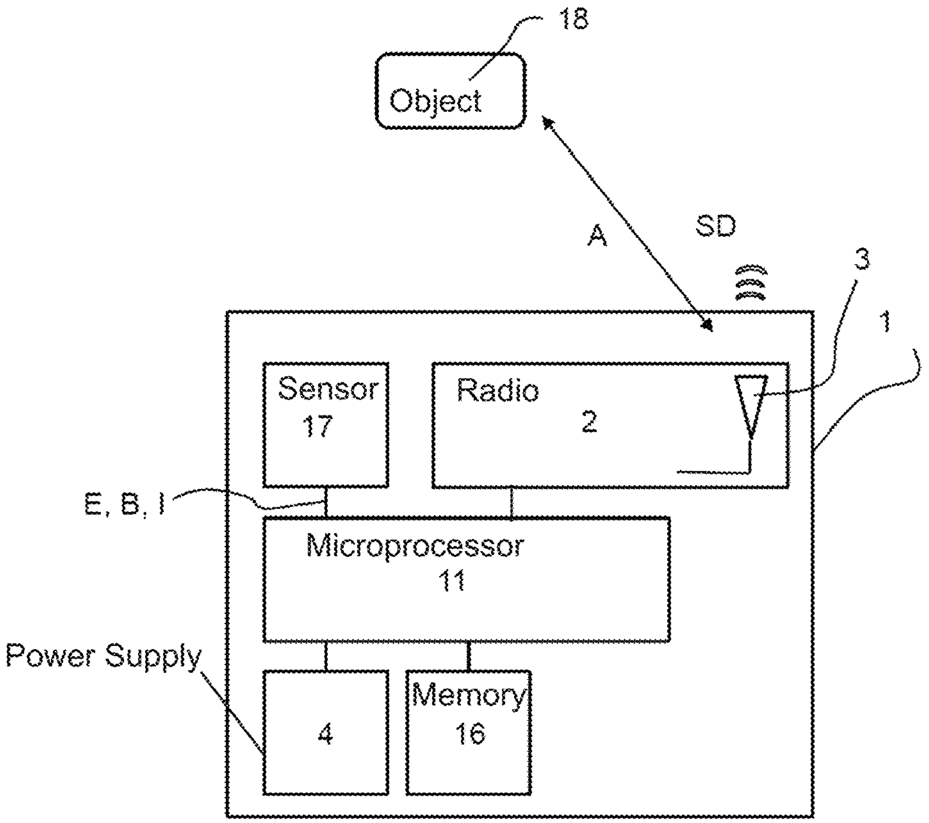
FIG. 2 is a highly simplified schematic diagram of an example of a node in the communications network of FIG. 1, for instance in the form of a sensor apparatus.

FIG. 2 is used to explain in greater detail an example of a design of a node 1 in the form of a sensor apparatus, although in principle this may also be identical or similar in the case of an actuator apparatus.

The node 1 contains a power supply apparatus 4, in particular a battery, which is energy self-sufficient over a long period. This is configured in particular to supply the node 1 with electrical power for years (long-life battery). The power supply apparatus preferably has a capacity of no more than 10 Ah in view of an energy-saving mode of operation.

In addition, a radio module 2 is provided, on which is formed an antenna 3. The antenna 3 can be housed in the radio module 2, preferably on its circuit board. However, it can also be preferably detachably connected to the radio module 2. The node 1 also contains a microprocessor 11, which can be provided as part of the radio module 2 or else separately therefrom. The microprocessor 11 is connected to a memory 16. In addition, at least one sensor element 17 can be provided, for instance a temperature sensor, piezoelectric transducer or the like, which is used to detect a physical or chemical property E, material constituents B or situational information I, and to output a corresponding measurement variable E, B, I.

FIG. 2 also shows, purely by way of example for illustrative purposes, an object 18 in the vicinity of the antenna 3 of the radio module 2 at a distance A from the node 1. The object 18 may be, for instance, a temporary perturbation source or else a permanently present perturbation source, which causes detuning of the antenna 3 and hence of the reception.

Figure 3:
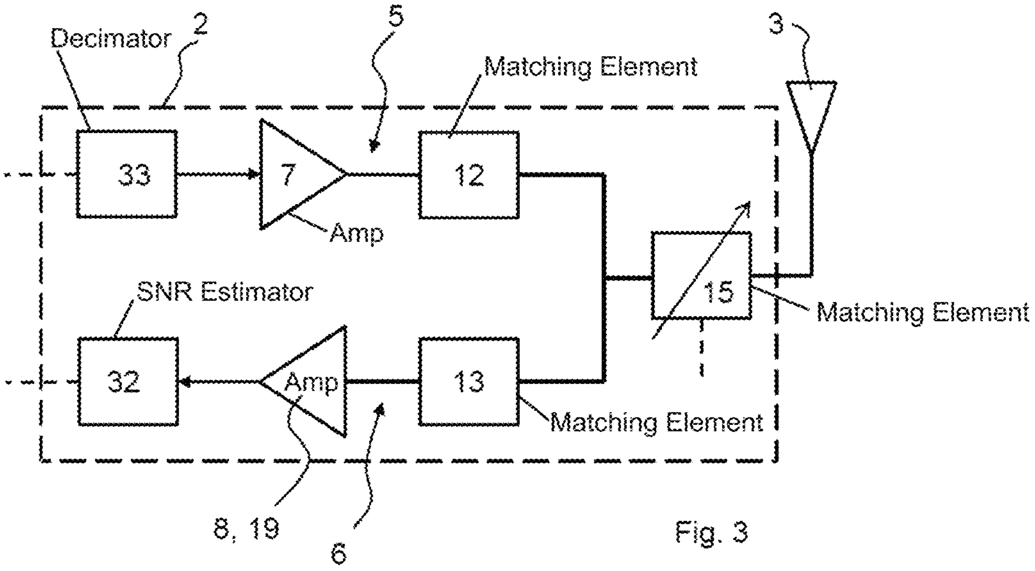
FIG. 3 is a highly simplified schematic diagram of a first example of a transmit and receive path of the node in the communications network of FIG. 1.

FIG. 3 shows in a highly simplified schematic form an example variant of the transmit path 5 and receive path 6 of the radio module 2 of the node 1 capable of bidirectional communication. The transmit path 5 contains a TX modulation element 9 for modulating, for instance, the signals originating from the sensor (not shown in FIG. 3), a PA or power amplifier 7, and a matching element 12, which achieves a match to 50 Ohms, for example. The receive path 6 likewise contains a corresponding matching element 13, and an amplifier, for instance an LNA 8 (low noise amplifier) and/or an RF front-end 19 for amplifying the signals received via the antenna 3.

The receive path 6 also contains a SNR estimator 32, whose operating principle is explained in detail later. Arranged after the antenna 3 is a matching element 15 for selective setting of different matchings Z0, Z1, Zn, i.e. different antenna matchings M0, M1, Mn or transformation paths for the receive mode and/or the transmit mode of the node 1. In this way, multi-stage antenna matching can be performed that is different in each case. For example, the matchings described in DE 10 2016 010 045 A1 can be provided as the selectively switchable matchings. Alternatively or additionally, other controllable elements that adjust the antenna matching, for instance voltage-controlled variable capacitances (e.g. varactor diodes), can also be used for this purpose. The matching element 15 can preferably be controlled by the microprocessor 11 (not shown in FIG. 3). The source impedance of the LNA 8 is composed of the unknown antenna impedance Z_Ant and the transformation path given by the associated antenna matching M0, M1, Mn. A power measurement (signal or noise) is preferably made at, or after, the output of the LNA 8.

The node 1 is normally in sleep mode in order to save energy. In order to receive a receive signal, the node 1 opens a receive window, this being done by the microprocessor 11 enabling the receive path 6, i.e. switching the receive path "to receive". As soon as a receive signal is received via the antenna 3, the matching element 15 varies successively a matching Z0, Z1, Zn of the receive path 6, which includes the antenna 3, and the associated SNR ratio SNR, SNR1, SNRn, or the change therein, is evaluated in each case in the SNR estimator 32. In the SNR estimator 32, that SNR ratio that is favorable, i.e. preferably the highest, is then selected from the set of determined SNR ratios SNR, SNR1, SNRn. The matching selected from the plurality of matchings Z0, Z1, Zn that have been cycled through can then be used for the transmit mode and/or receive mode. For the example configuration shown in FIG. 3, the adaptive matching of the impedance is the same. Thus, in this case the impedance matching also applies simultaneously to the transmit path 5. This need not necessarily be the case, however.

The matching element 15 can be implemented, for example, by means of fixed matching networks on a printed circuit board.

Figure 4:
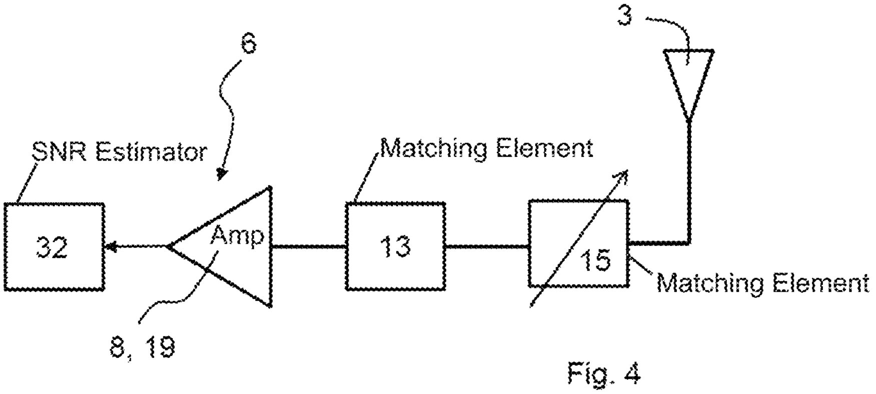
FIG. 4 is a highly simplified schematic diagram of a second example of a receive path of the node in the communications network of FIG. 1.

In the configuration of the receive path 6 shown in FIG. 4, the impedance matching element 15 is part of the receive path 6.

In the case of a node that is capable of unidirectional radio communication, the matching element 15 is part of the receive path 6 or the transmit path 5, depending on whether the node can only transmit or only receive.

The bandwidth can be included in the estimate of the matching-dependent SNR ratio. The SNR ratio SNR1-SNRn can be estimated from a digital receive signal or an analog receive signal.

According to a further exemplary embodiment of the invention, the SNR ratio, which is dependent on the given antenna matching, can also be estimated in the uplink by a receiver (e.g., of an additional node, a base station 10 or in the data center 28 or Cloud), and the appropriate antenna matching, or information based thereon, confirmed to the node 1 in the downlink. In this case, however, it may be sufficient to send only one message or a few messages in the uplink.

The SNR ratio can preferably be determined or estimated in relation to a symbol and/or frequency channel.

For example, the node 1 transmits on a first frequency for symbol 1 and on a second frequency for symbol 2. The receiver concentrates on symbol 1, for instance, by partitioning the receive bandwidth of the first frequency into a plurality of receive channels. This is preferably done by a frequency-domain separation e.g. by means of a Fourier transform (DFT or FFT) or by adjusting the phase locked loop (PLL). The number of expected occupied channels is known from the data rate of the uplink waveform. For example, symbol 1 has a bandwidth of 25 kHz. The receiver checks the power in each frequency channel. If a signal were present, a large amount of power would be detected in the frequency channel concerned, whereas little or no power would be detected in the other frequency channels. The spectrum depends on the modulation and pulse-shaping. These must be known to the receiver.

Figure 6A:
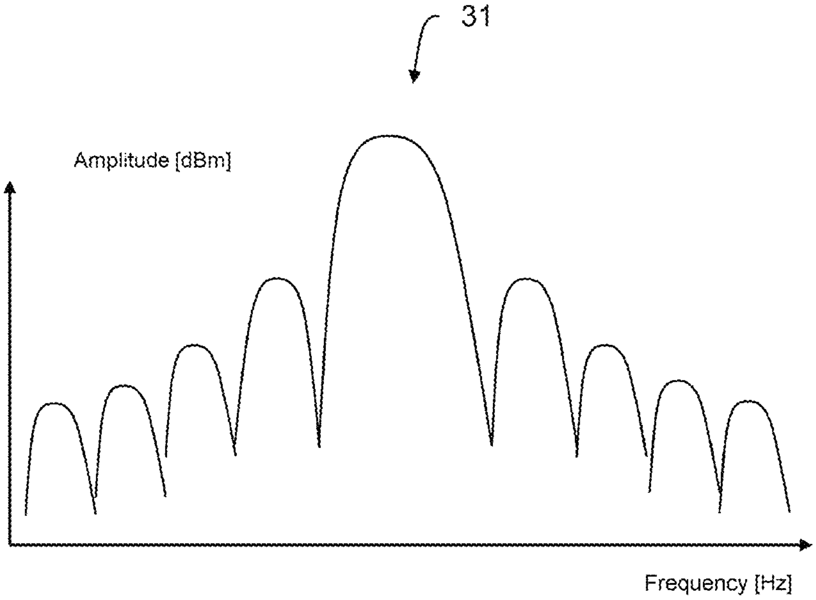
FIG. 6A is a graph showing a power variation of an MSK-modulated signal.

FIG. 6A shows by way of example the frequency spectrum of a known modulation (e.g., MSK with Gaussian filter with BT=1.0). A definite power gap is evident between the main lobe and side lobes.

Figure 6B:
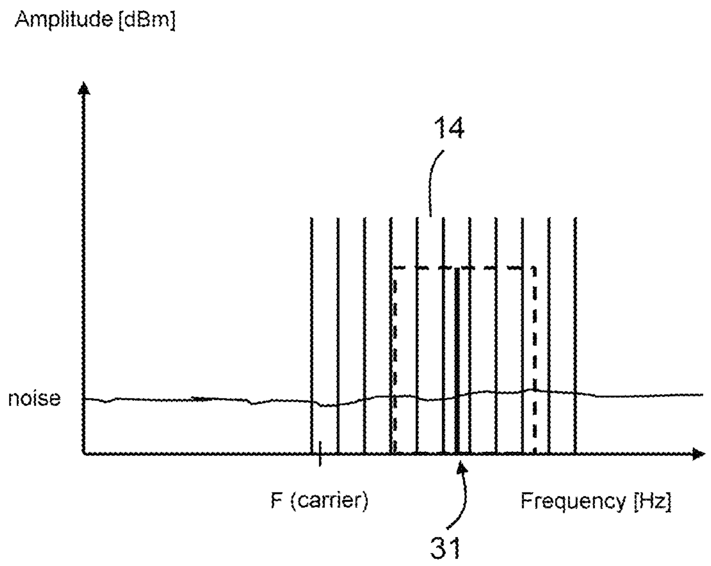
FIG. 6B is a graph showing frequency-channel partitioning in a frequency band of a symbol or bit.
Figure 6C:
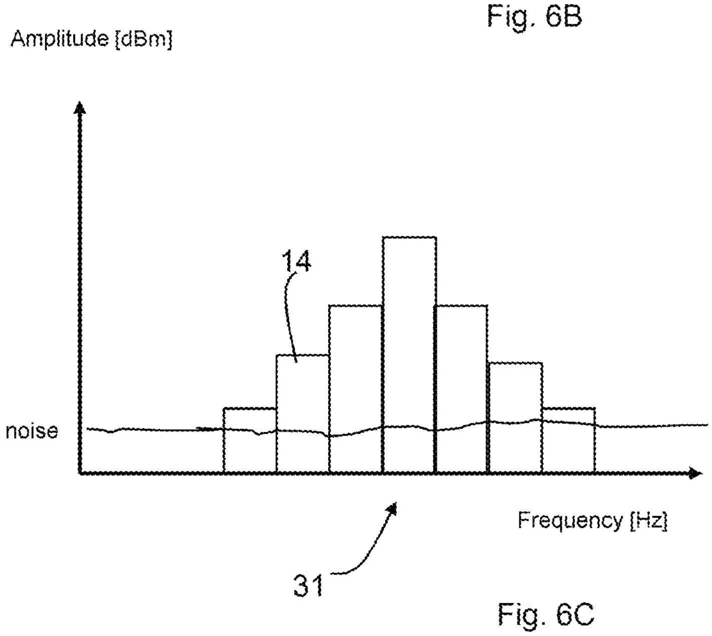
FIG. 6C is a graph showing power measured in each frequency channel in the frequency band of a symbol or bit.

FIG. 6B shows the frequency band (dashed line) for the symbol 31 by way of example. The frequency band or frequency spectrum of the symbol 31 depends on the modulation and what is known as the pulse-shaping. The frequency spectrum contains, for instance for MSK modulation with a Gaussian filter, as shown in FIG. 6A, a main lobe and a plurality of side lobes. In order to find a signal, the frequency band of interest can be partitioned into the individual receive channels 14, as shown in FIGS. 6B and 6C. The receiver checks the power in each frequency channel 14. If a signal has been detected then, as shown in FIG. 6B, a far greater power is measured in one channel 14 than in the other channels. The type of modulation and the pulse-shaping of the input signal should be known in the receiver. Thus, if a power is identified in a channel 14, and has the correct spacing as regards the frequency, then a signal for a symbol has been detected.

If, on the other hand, no appreciable differences were identified by the receiver in the individual frequency channels 14, then no usable signal was present, and therefore the receiver is disabled again or the receive window is closed again. The receive window can be re-opened at a later point in time.

On the basis of detecting the signal and the noise, then for each signal received from the receiver in the uplink for different antenna matchings, an associated SNR estimate can be performed.

Preferably, for the SNR estimate, the detection of a signal, for instance that for a specific symbol, can be performed repeatedly successively in time, and a comparison of the relevant measured values can be performed for a plurality of successively received symbols, preferably of the same type, or an averaging carried out.

Figure 5:
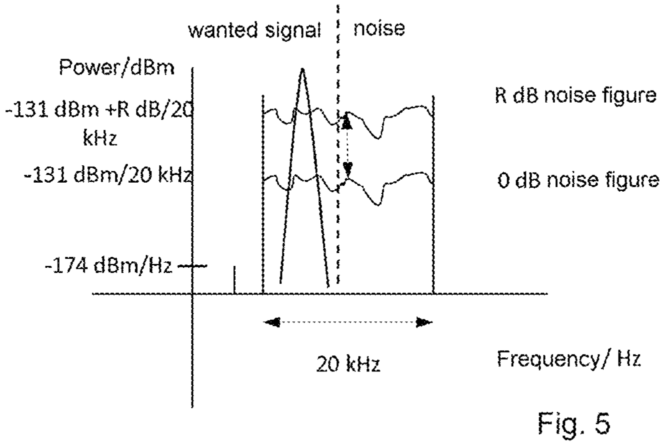
FIG. 5 is a graph showing an example of an added noise power R of the receiver of the node at a temperature of 20° C., and partitioning into two bands.

In the example diagram shown in FIG. 5, the receive band of bandwidth 20 kHz, for example, is partitioned by filters into two bands (wanted signal and noise). The band region on the left in FIG. 5 also contains the wanted signal; the right-hand band region contains only the base noise (noise floor). In the left-hand band region, according to the invention the gain or change in gain is ascertained for each of respective different antenna matchings Z0, Z1, Zn of the matching networks of the impedance matching element 15. In the right-hand band region, a measurement is made only of the increase in the base noise caused thereby. Thus from the available measured values, different SNR ratios SNR1-SNRn can be determined depending on the different impedances, and that antenna matching can be selected that corresponds to the highest SNR ratio, for instance.

An input signal that can form the basis for ascertaining the different SNR ratios SNR1-SNRn may also be an uplink signal from another node in the network rather than, for instance, a downlink signal from a base station 10.

Figure 7:
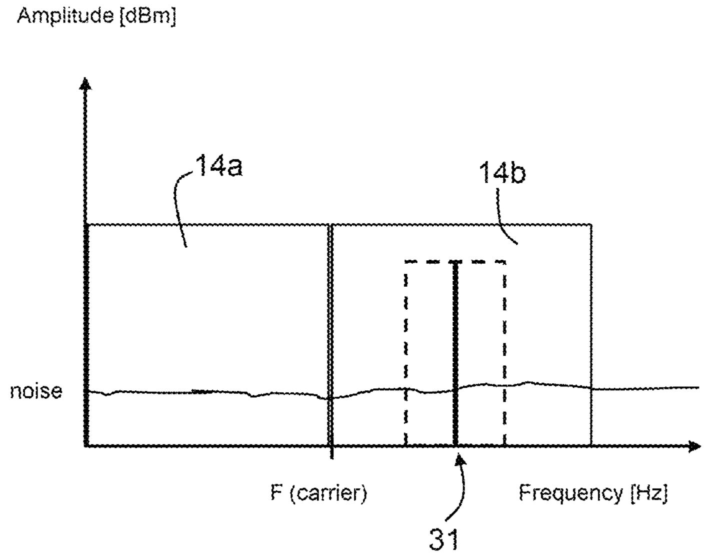
FIG. 7 is a graph showing another frequency-channel partitioning in the frequency band of a symbol or bit.

In the diagram shown in FIG. 7, the receive band is partitioned by two filters into two frequency channels 14*a*, 14*b* about the carrier frequency F (carrier), with the one frequency channel 14*a* on the left in FIG. 7 containing only the noise, and the other frequency channel 14*a* on the right in FIG. 7 containing a power caused by the signal for the symbol 31. This makes it possible to search, for instance, only in the frequency channel 14*b*, and hence to find more easily the input signal, for example for a symbol 31, in order to ascertain the associated SNR ratio.

Figure 8:
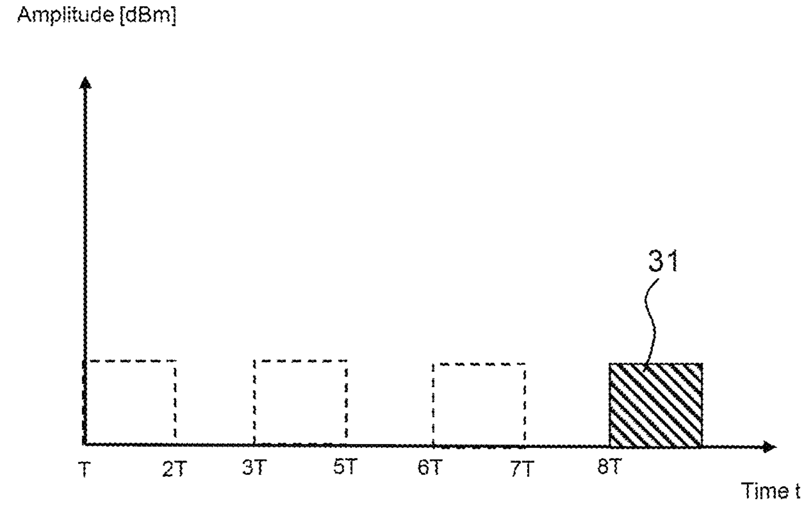
FIG. 8 is a graph showing a signal train in the time domain.

It is also possible to analyze the receive signal in terms of its time domain. Since the symbol duration or symbol sequence (pilot sequence or synchronization sequence or training sequence) is known, it is possible to observe according to the given symbol train an input/output signal, which switches with the symbol duration; cf. FIG. 8. When the symbol 31 is transmitted at 8T, a power is present, otherwise not. In this case, detecting the power within the preamble of a data packet is particularly advantageous because alternating symbols are transmitted there. The detection of the power should preferably comprise a plurality of preferably identical symbols in order to be able to perform the estimate of the associated SNR ratio over a plurality of symbols preferably of the same type. Again in this case, the power (signal or noise) is measured for each of a plurality of antenna matchings Z0, Z1, Zn.

Figure 11:
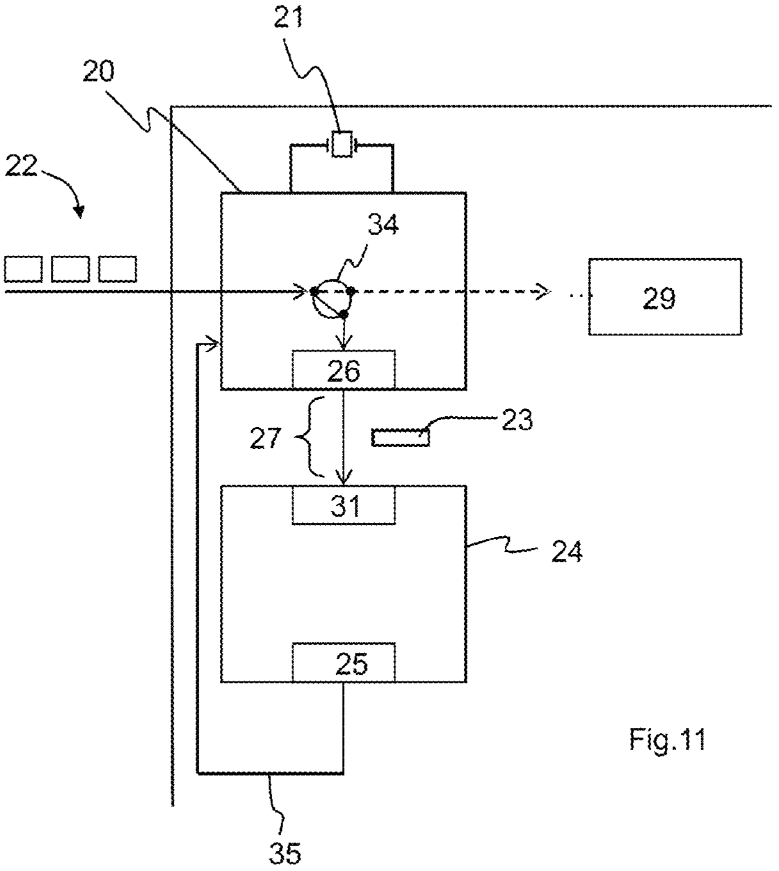
FIG. 11 is a highly simplified schematic diagram of an arrangement for ascertaining the SNR ratio from I/Q data.

An estimate of the SNR ratio on the basis of digital signals or I/Q signals for different matchings is shown by way of example in FIG. 11. The analog input signals (data packets 22 or segments of data packets) are processed after the input in the receive apparatus or the radio chip 20 into digital signals or I/Q signals for instance by means of an I/Q technique (in-phase/quadrature technique). This can be done, for example, by splitting the analog input signal into two signal components, where one signal component is generated with the original phase (I data), and the other signal component is generated at a reference frequency shifted through 90°, for instance, (Q data). In this case, these signals or data 23 can be diverted out of the radio chip 20, for instance by means of a switch 34, and fed via an interface 27 to a microcontroller 24, wherein a power measurement can be performed on the digital data 23 or digitized data, for instance in the microcontroller 24. The diverted digital data 23 or digitized signals are thus not decoded in the radio chip 20 or a downstream decoder 29 but are used for ascertaining the associated SNR ratio. The radio chip has a clock generator (quartz) 21 and a digital filter 26.

The filter 26, which may be arranged on the radio chip 20 or on the microprocessor 24, can be used, for instance, to filter the data and feed the data to a decimator 33. Here, a portion of the data is selected by means of an integer decimation factor, and finally used for ascertaining the SNR ratio. In addition, the microcontroller can have a memory 25. The measured or estimated data, or data or information derived therefrom, can be fed back, for instance via a feedback channel 35, to the radio chip 20 or otherwise conditioned in order to be able to establish the appropriate matching. The individual functionalities can obviously also be combined in the radio chip 20.

The receiver can thereby measure from the digital data (I/Q data), for instance within a data packet, the signal level and the noise floor for each of the different matchings, and compare the measured values, or values derived therefrom, with one another. The matching having the most favorable or highest SNR ratio can be selected. This way of estimating the SNR ratio is significantly faster and also considerably more flexible in how it is ascertained. The data that is not diverted is decoded in the decoder 29.

The symbols are preferably symbols based on frequency modulation and/or amplitude modulation, for instance MSK, FSK or QPSK modulation.

Figure 9:
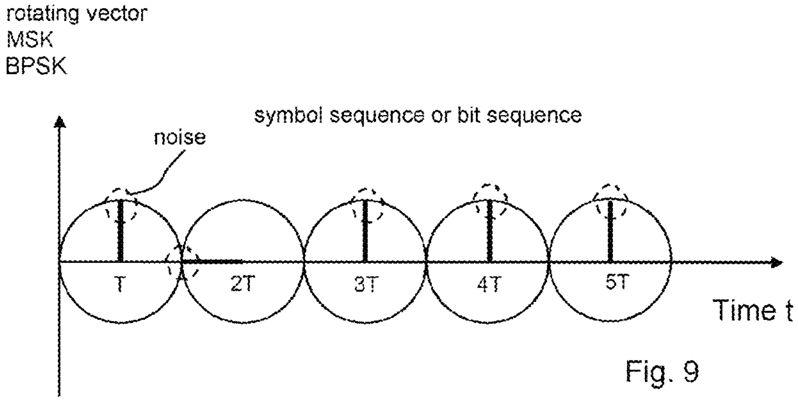
FIG. 9 is a graph showing in Cartesian coordinates a symbol or bit sequence over time.

An alternative variant of estimating the SNR ratio can also be based on correlation. The base station 10 transmits a known symbol sequence, pilot sequence or bit sequence, for instance 10111, and once it has been found (cf. e.g. FIG. 9) an SNR estimate is performed. It is possible, for example, to average over the measured powers associated with the individual pilots. In addition, the proportion of noise is known (cf. FIG. 9, dashed circle), and therefore the SNR ratio can be determined therefrom.

Alternatively, if there is no known symbol present, the symbol 31 of interest can be detected using a frequency threshold, with the detected symbols of the same type then being analyzed in terms of their power. This variant requires slightly more computing power.

According to a further embodiment according to the invention, a change in noise figure and change in gain are ascertained from at least two SNR values, and the impedance Z_Ant of the antenna derived therefrom. The following model is used to ascertain the change in gain and the change in noise figure from the SNR ratio, Gain refers to the total gain, i.e. the total input amplification in the receive path 6. Likewise, the noise figure refers to the total noise figure of the input path 6, regardless of whether the noise figure is caused by the LNA 8 or by a mismatch. The gain G1 and the noise power N1 added thereto vary for a receive signal according to the impedance. For a fixed matching circuit, G1 and N are unchanged. The SNR estimate is then obtained as follows:

$$SNR_1 = \frac{SG_1}{N_1}$$

The sum of both powers is also known:

$$P_{tot1} = SG_1 + N_1.$$

If now the impedance matching Z, Z+1, Z+n of the input path is changed, the gain $G_2$ and the noise power $N_2$ also change. The SNR ratio and the total power are obtained as follows:

$$SNR_2 = \frac{SG_2}{N_2}$$

$$P_{tot2} = SG_2 + N_2$$

Comparing both total powers gives:

$$\frac{P_{tot1}}{P_{tot2}} = \frac{SG_1 + N_1}{SG_2 + N_2} = \frac{N_1\left(\frac{SG_1}{N_1} + 1\right)}{N_2\left(\frac{SG_2}{N_2} + 1\right)} = \frac{N_1(SNR_1 + 1)}{N_2(SNR_2 + 1)}$$

Since $$\frac{P_{tot1}}{P_{tot2}}$$

and also $SNR_1$ and $SNR_2$ can be estimated, the ratio between $N_1$ and $N_2$ is known, which is also the case if the noise powers are estimated separately:

$$\frac{N_1}{N_2} = C_1$$

Comparing the ratio of $SNR_1$ and $SNR_2$ gives:

$$\frac{SNR_1}{SNR_2} = \frac{\frac{SG_1}{N_1}}{\frac{SG_2}{N_2}} = \frac{G_1 N_2}{G_2 N_1} = C_2$$

Alternatively, C2 can also be found directly by dividing the signal power for matching 1 and the signal power for matching 2:

$$\frac{G_1}{G_2} = \frac{S_1}{S_2} = \frac{G_1 S}{G_2 S} = C_3$$

The ratio of the two gains can be found therefrom:

$$\frac{G_1}{G_2} = C_2 \frac{N_1}{N_2} = C_2 C_1 = C_3$$

Figure 10A:
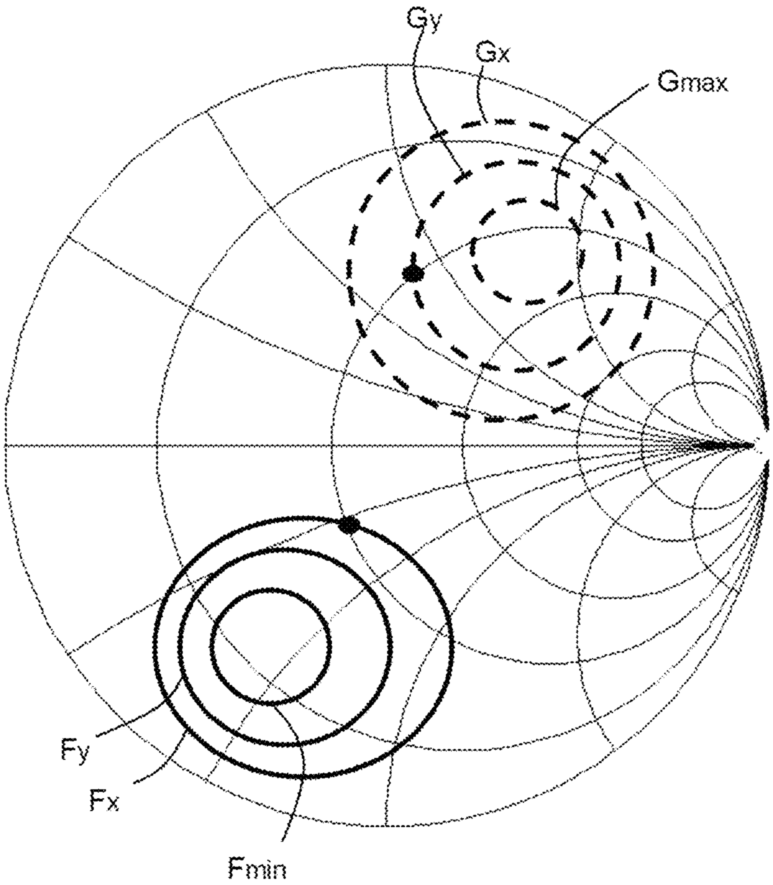
FIG. 10A is a highly simplified schematic diagram of the relationships in a Smith chart for an estimate based on the best-fit approach.

Thus the change in the noise figure F and the change in the gain can be determined definitively from the two SNR values and the total power; see the points on the set of lines in the Smith chart of FIG. 10A.

The impedance can be determined definitively from the two ratios:

$$\frac{G(Z_2)}{G(Z_1)} = C_3$$

$$\frac{N(Z_2)}{N(Z_1)} = C_1$$

Since the dependency of the gain on the impedance Z is known, and the noise power N is a known function for obtaining the noise figure from the impedance, there are 2 equations and 2 unknowns Z1 and Z2. It is therefore possible to find the unknowns.

The impedance Z_Ant of the antenna can then be obtained definitively from Z1 and Z2. The G function and the N function are measured in advance in the laboratory over the entire receiver and stored in the μC.

Figure 10B:
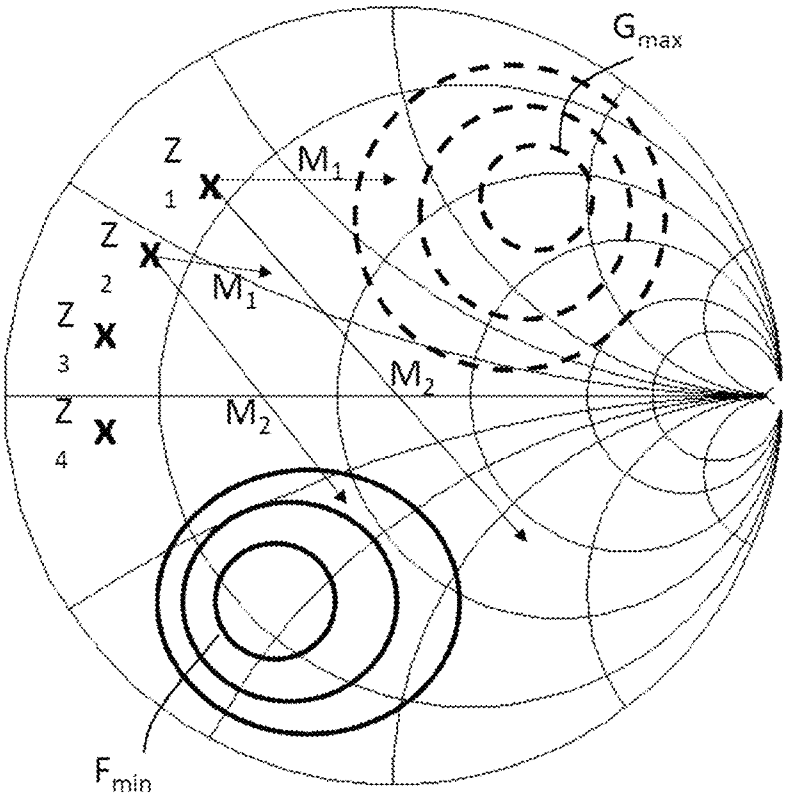
FIG. 10B is a highly simplified schematic diagram of further relationships in the Smith chart for an estimate based on the best-fit approach.

Preferably a plurality of gain ratios and a plurality of noise-figure ratios can be obtained. This means that a plurality of distances are known in the Smith chart of FIG. 10B, allowing the impedance to be obtained more definitively.

First, all the points that satisfy the equations are found on the Smith chart. If there are a plurality of points that give sensible antenna impedances by back-transformation, further matchings are set in order to have even more equations, or a closer point (a more likely point) is selected.

In addition, the unknown (sought) antenna impedance range can be determined by minimizing the difference between measured and modulated gain/noise figure.

Noise figure F and gain G are thus deterministic functions of the source impedance Z of the receiver (receive path 6). This functional relationship can be measured a priori in the laboratory for the existing LNA, and stored in a suitable form in the radio module (e.g. in a table).

The source impedance of the LNA Z_Q is composed of the unknown antenna impedance Z_Ant and the transformation path T_Match (M1, M2, M3) given by the variable antenna matching. The circuit has N different selectable transformation paths known a priori.

For an unknown impedance Z_Ant and a transformation path T_Match selected from the N possible paths, it is thus possible to calculate from the laboratory data stored in the device:

Noise figure according to model: F_model (Z_Q) =F_model (Z_Ant, T_Match)

Gain according to model: G_model (Z_Q)=G_model (Z_Ant, T_Match)

Now the device can measure the gain ratios and the noise-figure ratios for all N possible transformation paths. This yields two vectors of N elements.

For these N transformation paths, it is also possible to calculate in the device from the above model data an expected noise floor that depends on the unknown antenna impedance.

Hence the unknown, sought antenna impedance can be obtained mathematically by minimizing the difference between measured and modelled gain/noise figure:

$$Z_{Ant,sought} = \min_{Z_{Ant}} differenceModelToMeasurement$$

$$Z_{Ant,sought} = \min_{Z_{Ant}}(\|MeasuredGain(T_{Match}) - GainModel(Z_{Ant}, T_{Match})\| + \|MeasuredNoiseFigure(T_{Match})NoiseFigureModel(Z_{Ant}, T_{Match})\|)$$

The following is a summary list of reference numerals and the corresponding structure used in the above description of the invention:

1 node
2 radio module
3 antenna
4 power source
5 transmit path
6 receive path
7 PA (power amplifier)
8 LNA (low noise amplifier)
9 TX modulation element
10 node
11 microprocessor
12 noise matching element
13 noise matching element
14*a* frequency channel
14*b* frequency channel
15 impedance matching element
16 memory
17 sensor element
18 object
19 RF front-end
20 radio chip
21 clock generator (quartz)
22 data packet
23 V/Q data
24 microprocessor
25 memory
26 filter
27 interface
28 data center
29 decoder

30 data packet
31 bit
32 SNR estimator
33 decimator
34 switch
35 feedback channel
G gain
F noise figure
M transformation path
N noise power
Z impedance point

The invention claimed is:

1. A method for improving antenna matching for a node of a communications network, the node being capable of radio communication and having a radio module equipped with an antenna and a transmit path and/or a receive path, and the node further having a power supply apparatus, wherein the antenna having an impedance, which further comprises:

determining empirically a dependency of a gain on matchings and storing the dependency of the gain in the node;

determining empirically a dependency of a noise power on the matchings and storing the dependency of the noise power in the node; and estimating the impedance of the antenna from a change in the gain and in the noise power caused by the matchings, or selecting the antenna matching for operating the node on a basis of considering an approximation or best fit.

2. A method for improving antenna matching for a node of a communications network, the node being capable of radio communication and having a radio module equipped with an antenna and a transmit path and/or receive path, the node further having a power supply apparatus, wherein the antenna having an impedance, which comprises the steps of:

sending, via the node, a plurality of packets or portions of the packets for different matchings;

performing, via a receiver, signal to noise ratio estimates on a basis of the packets or the portions of the packets; and notifying, via a recipient, the node of a matching from the different matchings, or information based thereon.

3. The method according to claim 2, wherein the different matchings are known to the recipient or a base station.

4. The method according to claim 2, wherein matching-associated SNR ratios for a plurality of nodes or for the node and a base station are taken into account.

5. The method according to claim 4, wherein:

account is taken in a transmit situation for one node and in a receive situation for another node; or account is taken in a transmit situation for one node and in a receive situation for the base station, or account is taken in a transmit situation for the base station and in a receive situation for the node.

6. A node capable of radio communication, the node comprising:

a radio equipped with an antenna and a transmit path and/or receive path;

a power supply apparatus;

an impedance matching element; and the node being a node of a communications network and being operated in accordance with a method for improving antenna matching for the node of the communications network, the method which comprises the steps of:

estimating, in a receive situation and/or in a transmit situation in a case of adjustable matchings, a signal-to-noise ratio associated with each of the adjustable matchings; and selecting a matching from different ones of the adjustable matchings for a receive mode and/or a transmit mode.

* * * * *